United States Patent
Lang et al.

(10) Patent No.: US 6,702,449 B2
(45) Date of Patent: *Mar. 9, 2004

(54) CARRIER PLATE FOR MIRROR ASSEMBLY

(75) Inventors: Heinrich Lang, Ergersheim (DE); Alexander Stenzel, Bad Windsheim (DE)

(73) Assignee: Lang-Mekra North America, LLC, Ridgeway, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 10/295,110

(22) Filed: Nov. 15, 2002

(65) Prior Publication Data

US 2003/0067695 A1 Apr. 10, 2003

Related U.S. Application Data

(63) Continuation of application No. 09/266,987, filed on Mar. 12, 1999, now Pat. No. 6,520,653.

(30) Foreign Application Priority Data

Sep. 2, 1998 (DE) .......................................... 198 40 004

(51) Int. Cl.⁷ .............................................. G02B 7/182
(52) U.S. Cl. ........................ 359/871; 359/848; 359/855; 359/864; 359/865
(58) Field of Search ................................ 359/871, 848, 359/855, 864, 865, 872, 877, 883, 870; 248/476, 481

(56) References Cited

U.S. PATENT DOCUMENTS

| | | |
|---|---|---|
| 3,644,022 A | 2/1972 | Jagt et al. |
| 4,174,823 A | 11/1979 | Sutton et al. |
| 4,488,778 A | 12/1984 | Polzer et al. |
| 4,550,046 A | 10/1985 | Miller |
| 4,555,166 A | 11/1985 | Enomoto |
| 4,693,571 A | 9/1987 | Kimura et al. |
| 4,696,555 A | 9/1987 | Enomoto |
| 4,701,037 A | 10/1987 | Bramer |
| 4,740,068 A | 4/1988 | Fisher |
| 4,764,004 A | 8/1988 | Yamada et al. |
| 4,818,090 A | 4/1989 | Righi |
| 4,867,408 A | 9/1989 | Ozaki |
| 4,877,214 A | 10/1989 | Toshiaki et al. |
| 4,877,319 A | 10/1989 | Mittelhäuser |
| 4,915,493 A | 4/1990 | Fisher et al. |
| 4,957,359 A | 9/1990 | Kruse et al. |
| 4,988,178 A | 1/1991 | Eifert |
| 4,991,950 A | 2/1991 | Lang et al. |
| 4,998,814 A | 3/1991 | Perry |
| 5,110,196 A | 5/1992 | Lang et al. |
| 5,115,352 A | 5/1992 | do Espirito Santo |

(List continued on next page.)

FOREIGN PATENT DOCUMENTS

| | | |
|---|---|---|
| DE | 4010083 | 10/1991 |
| EP | 0590510 | 4/1994 |

*Primary Examiner*—Drew Dunn
*Assistant Examiner*—Tayez Assaf
(74) *Attorney, Agent, or Firm*—McNair Law Firm, P.A.; Cort Flint

(57) ABSTRACT

An external rearview mirror includes a holder for affixing the mirror to a motor vehicle. A carrier plate is located in a housing that is secured to the holder. At least one mirror assembly with a mirror pane is mounted pivotally on the carrier plate in the housing. At least one means of adjustment is mounted on the carrier plate and bound to the mirror assembly. A base plate is attached to the carrier plate, the base plate having a honeycomb structure with a multiplicity of cells on at least one side. The cells are integral and normal to the base plate and may vary in both height and diameter.

26 Claims, 10 Drawing Sheets

U.S. PATENT DOCUMENTS

| | | |
|---|---|---|
| 5,151,824 A | 9/1992 | O'Farrell |
| 5,227,924 A | 7/1993 | Kerper |
| 5,268,795 A | 12/1993 | Usami |
| 5,355,255 A | 10/1994 | Assinder |
| 5,363,246 A | 11/1994 | Perry et al. |
| 5,371,659 A | 12/1994 | Pastrick et al. |
| 5,443,884 A * | 8/1995 | Lusignea et al. ............ 428/116 |
| 5,467,230 A | 11/1995 | Boddy et al. |
| 5,477,390 A | 12/1995 | Boddy et al. |
| 5,477,391 A | 12/1995 | Boddy |
| 5,483,385 A | 1/1996 | Boddy |
| 5,497,275 A | 3/1996 | Perry et al. |
| 5,568,326 A | 10/1996 | Yoshida et al. |
| 5,604,644 A | 2/1997 | Lang et al. |
| 5,615,054 A | 3/1997 | Lang et al. |
| 5,621,577 A | 4/1997 | Lang et al. |
| 5,687,035 A | 11/1997 | Lang |
| 5,721,646 A * | 2/1998 | Catlin et al. ................. 359/865 |
| 5,798,882 A | 8/1998 | Lang |
| 5,889,627 A | 3/1999 | Englander et al. |
| 5,938,166 A | 8/1999 | Seichter et al. |
| 5,963,127 A | 10/1999 | Lang et al. |
| 6,057,025 A * | 5/2000 | Kalman ....................... 428/116 |
| 6,483,530 B2 * | 11/2002 | Wilson ....................... 347/263 |

* cited by examiner

CARRIER PLATE FOR MIRROR ASSEMBLY

RELATED APPLICATIONS

The present application is a Continuation Application of U.S. application Ser. No. 09/266,987, filed Mar. 12, 1999, now U.S. Pat. No. 6,520,653 B1, incorporated by reference herein, claiming priority under 35 U.S.C. §119 to German Patent Application No. 198 40 004.7, filed Sep. 2, 1998 in the German Patent Office.

FIELD OF THE INVENTION

The invention concerns an external mirror for motor vehicles, in particular for commercial vehicles, having an improved carrier plate structure.

BACKGROUND OF THE INVENTION

A substantial problem with external mirrors, particularly in the case of commercial vehicles, is the occurrence of vibration. First, vibration can negatively affect the use of the mirror, and second, vibration of the mirror can lead to damage due to fatigue.

An attempt at a solution to this problem is disclosed in German Patent Publication No. DE-A-40 10 083. In the mirror construction there given, the housing does not exert any carrying function. This carrying function was taken over by means of a holding apparatus onto which a securing means for the affixing of the mirror on a commercial vehicle is fastened. The housing, and at least one mirror pane of the external mirror and an adjustment unit for the positioning of the mirror, are affixed to the holding apparatus. The disadvantage of this is that the carrier plate and the holding apparatus are of separate construction, leading to the danger that the stability of securement of the carrier plate in the holder is reduced. This is especially the case when—as shown in embodiment of DE-A-40 10 083—the housing is clamped between the holding apparatus and the carrier plate, since here, vibrations can be transferred easily to the carrier plate.

Another external mirror for a motor vehicle is made known by U.S. Pat. No. 4,701,037, wherein a holding arm running to the body and a single piece carrier plate with a molded-on clamp bearing is provided. Where this is concerned, a mirror position adjustment unit is involved onto which a mirror carrier plate is mounted with its mirror pane.

Finally, European Patent Publication No. EP-A-0 590 510 brings into common knowledge an external mirror for commercial vehicles, which exhibits a holder for connection to the body of the vehicle, a carrier plate disposed in a housing, upon which a housing is held and on which, by means of a fastening device the holder is secured, at least one pivotable mirror assembly with a mirror pane is fastened to the carrier plate, and at least one adjustment unit, which is affixed to the carrier plate and is at least bound to the pivoting of said mirror assembly. Experience has shown that even with this mirror design, in actual use, the vibrations are still very large. This is true especially where installation in a truck is involved.

SUMMARY OF THE INVENTION

Thus, it is the purpose of the present invention to make available an external mirror for vehicles, especially for commercial vehicles, which is less subject to vibration.

The achievement of this purpose can be accomplished by the features of the claimed invention wherein the carrier plate possesses a base plate and has at least on one side, integral with the base plate, a honeycomb structure incorporated, to decidedly improve the vibratory behavior of an external mirror.

By means of the honeycomb structure, especially when it is on both sides of the base plate, the stability is increased, so that it becomes possible to use plastic instead of metal for the carrier plate, which in turn leads to weight and cost reductions.

In accord with an advantageous embodiment of the invention, the customary hexagonal celled honeycomb can, in various areas of the carrier plate, exhibit different diameters. In this way, the different loadings in various areas of the carrier plate can be taken into consideration. Likewise, it is possible for the heights of the honeycomb cell walls to vary. By means of this variation of the heights of the cell walls, the interactive clamp anchor can be designed as the clamping means integral with the carrier plate.

In accord with a further advantageous embodiment of the invention is a recess for the adjustment device made as one piece with the carrier plate. By means of this recess, the adjustment device is secured by shape forcing, which leads substantially to an improvement of the vibration behavior, that is, strong vibration damping is effected.

In accord with another advantageous embodiment of the invention, the honeycomb structure on the front side, opposite to the honeycomb structure on the back side of the base plate, are mutually offset. This is a further means of increasing the stability and further improves the damping qualities.

In accord with yet another advantageous embodiment of the invention, the carrier plate possesses integral, molded on fastening elements for its securement to a housing base, which latter carries a peripherally circumscribing housing rim, which laterally limits the pivoting motion of the mirror pane.

In the case of an alternative embodiment, the base plate of the carrier plate, the housing base, and the housing rim are designed to be one piece. This simplifies the erection and moreover, the reduced number of the individual components leads to a cost savings and also to an improved stability, which brings in turn an improvement in the vibrational behavior.

BRIEF DESCRIPTION OF THE DRAWINGS

Further details, features and advantages of the invention arise from the following description of examples portrayed by embodiments of the invention with the help of the drawings. There is shown in.

DESCRIPTION OF THE PREFERRED EMBODIMENTS

Figure 1:
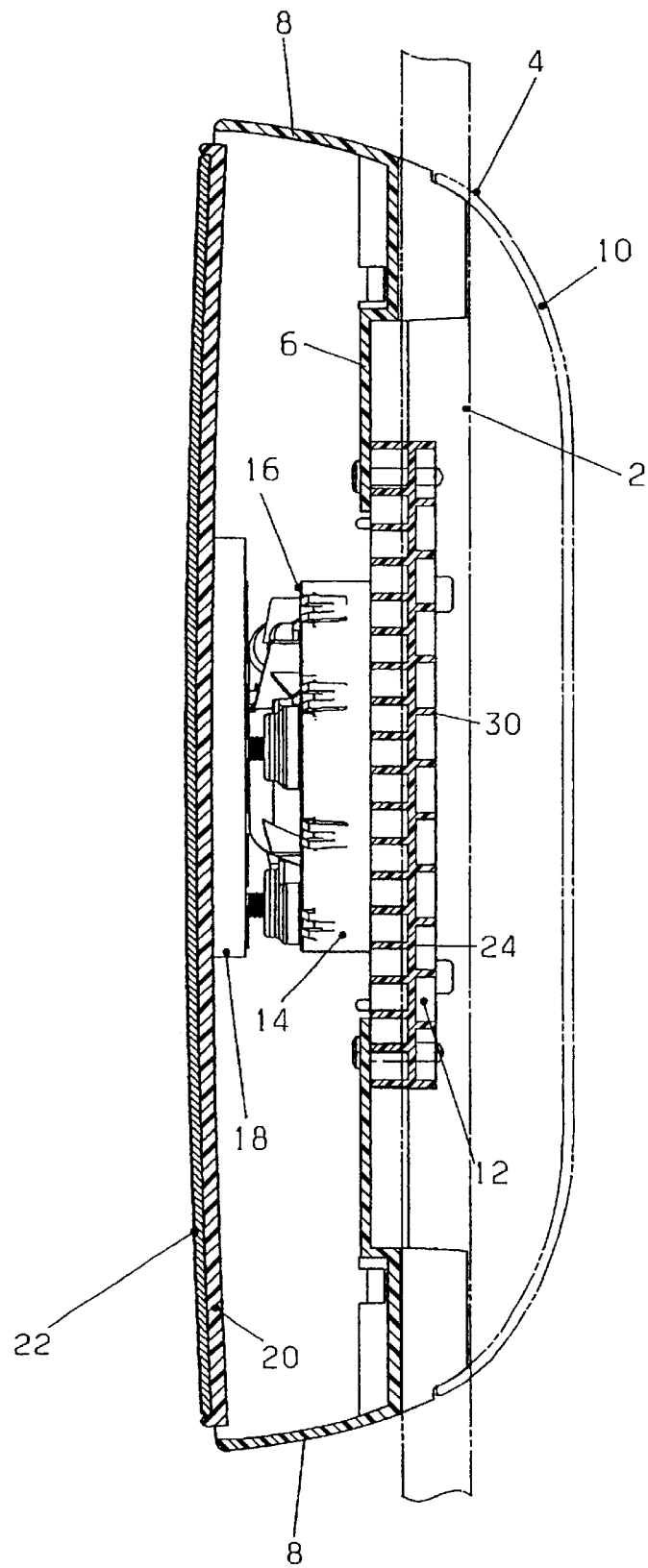
FIG. 1 a longitudinal profile view through a first embodiment of the present invention, FIG. 2 a perspective view of an embodiment example of a carrier plate with honeycomb structure of the present invention, FIG. 3 a top view of the back side of the carrier plate of FIG. 2, FIG. 4 a top view of the front side of the carrier plate of FIG. 2, FIG. 5a a side view of the carrier plate in accord with FIG. 2, FIG. 5b a further side view of the carrier plate in accord with FIG. 2, FIG. 6 a sectional view along the line A—A in FIG. 4, FIG. 7 a top view onto a second embodiment of the invention, FIG. 8 a sectional view along the line B—B in FIG. 7, FIG. 9 a sectional view along the line A—A of FIG. 7, FIG. 10 a sectional view corresponding to FIG. 9 of a second version of the second embodiment, and FIG. 11 a sectional view corresponding to FIG. 9, of a third version of the second embodiment.

Reference will now be made in detail to the presently preferred embodiments of the present invention, one or more examples of which are illustrated in the drawings. Each example is provided by way of explanation of the invention, and is not meant as a limitation of the invention. For example, features illustrated or described as part of one embodiment can be used on another embodiment to yield yet another embodiment, and it is intended that the present invention include such modifications and variations.

A first embodiment of the invention, with reference to FIG. 1, shows a longitudinal section through a first embodiment of the external mirror for vehicles in accord with the invention. The external mirror assembly encompasses a holder 2—designated by a dotted line—for the fastening of the mirror onto the vehicle, a housing 4, with a housing base 6, which extends into a housing rim 8, and a covering 10. The housing base 6 is mounted on a carrier plate 12, on the front side of which an opening 14 and the positional adjustment unit 16 are disposed. On the adjustment unit 16, a mirror carrying plate 18 is mounted. Holding plate 20 is fitted to plate 18. A mirror pane 22, with the help of a clamping closure connection, is fixed to the holding plate 20.

Figure 2:
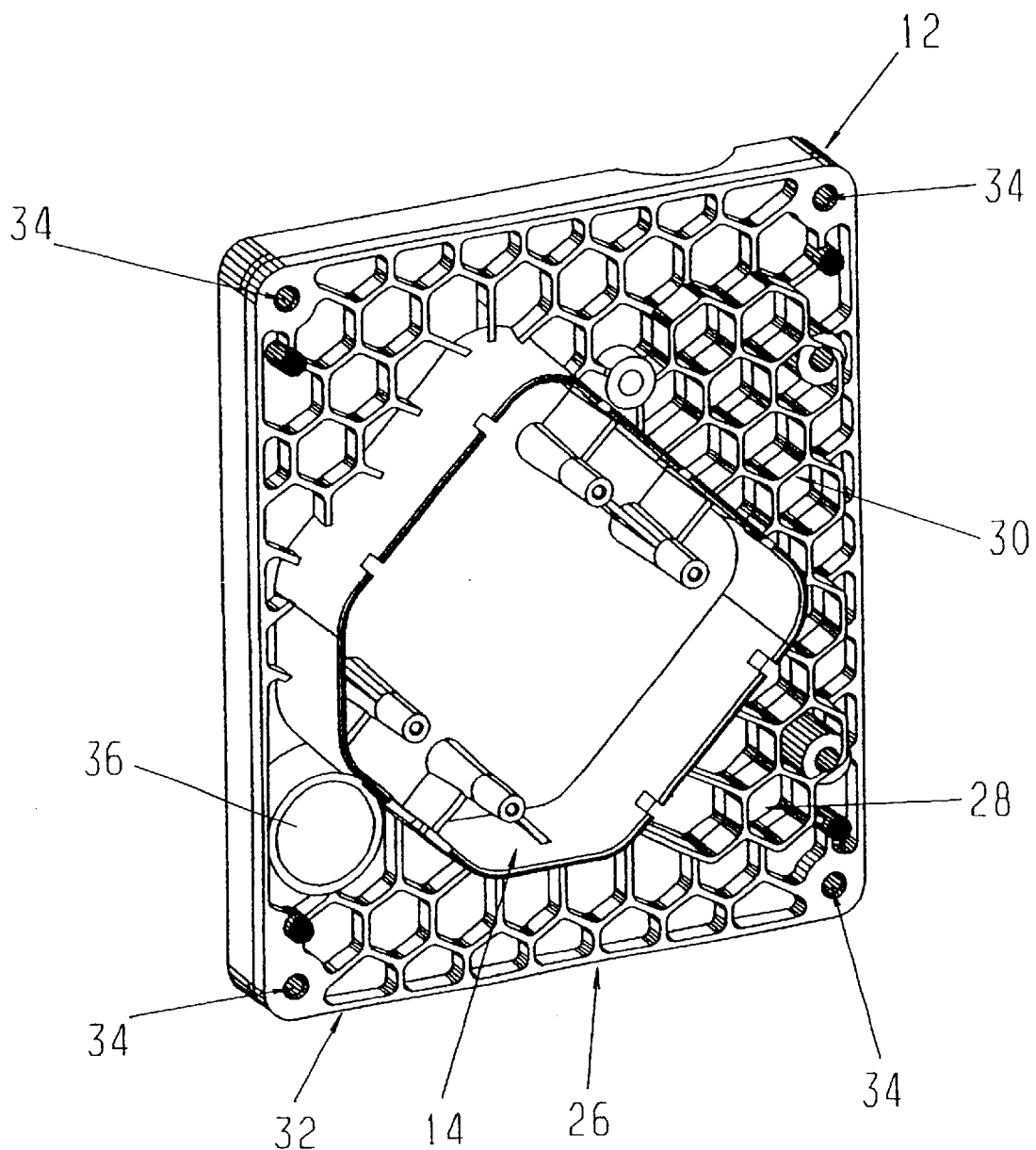

FIG. 2 shows a perspective presentation of the carrier plate 12. The carrier plate 12 includes a flat base plate 24 upon which, on both sides, a honeycomb structure 26 is made integral with base plate 24. The honeycomb structure is comprised of hexagonal cells 28, located close to one another, each having, of course, six cell walls 30, whereby, respectively, the two neighboring cells 28 each share the interposed cell wall 30.

The rectangular base plate 24 is peripherally enclosed by a sidewall 32 extending in a direction normal to the base plate 24.

Figure 3:
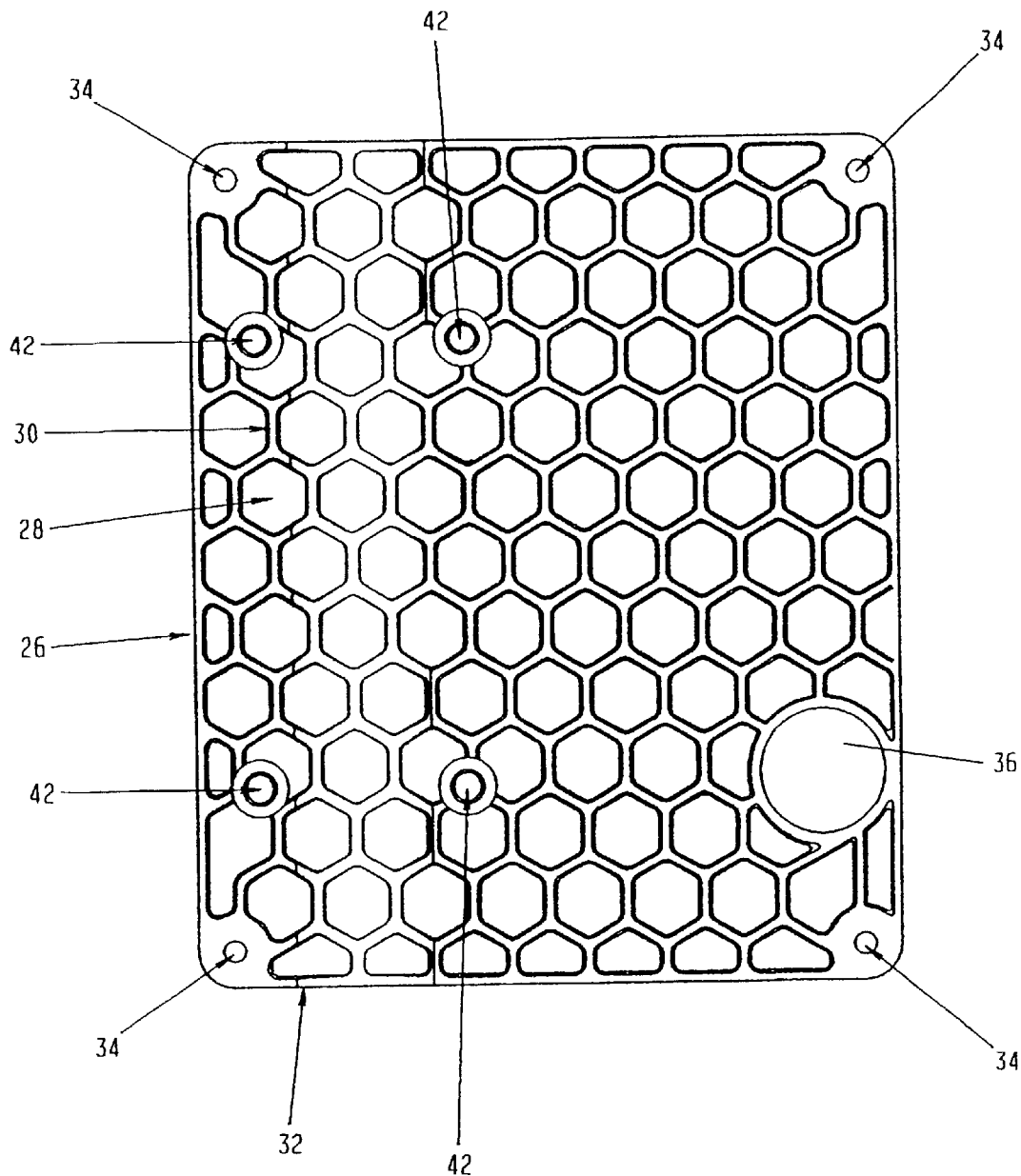
Figure 4:
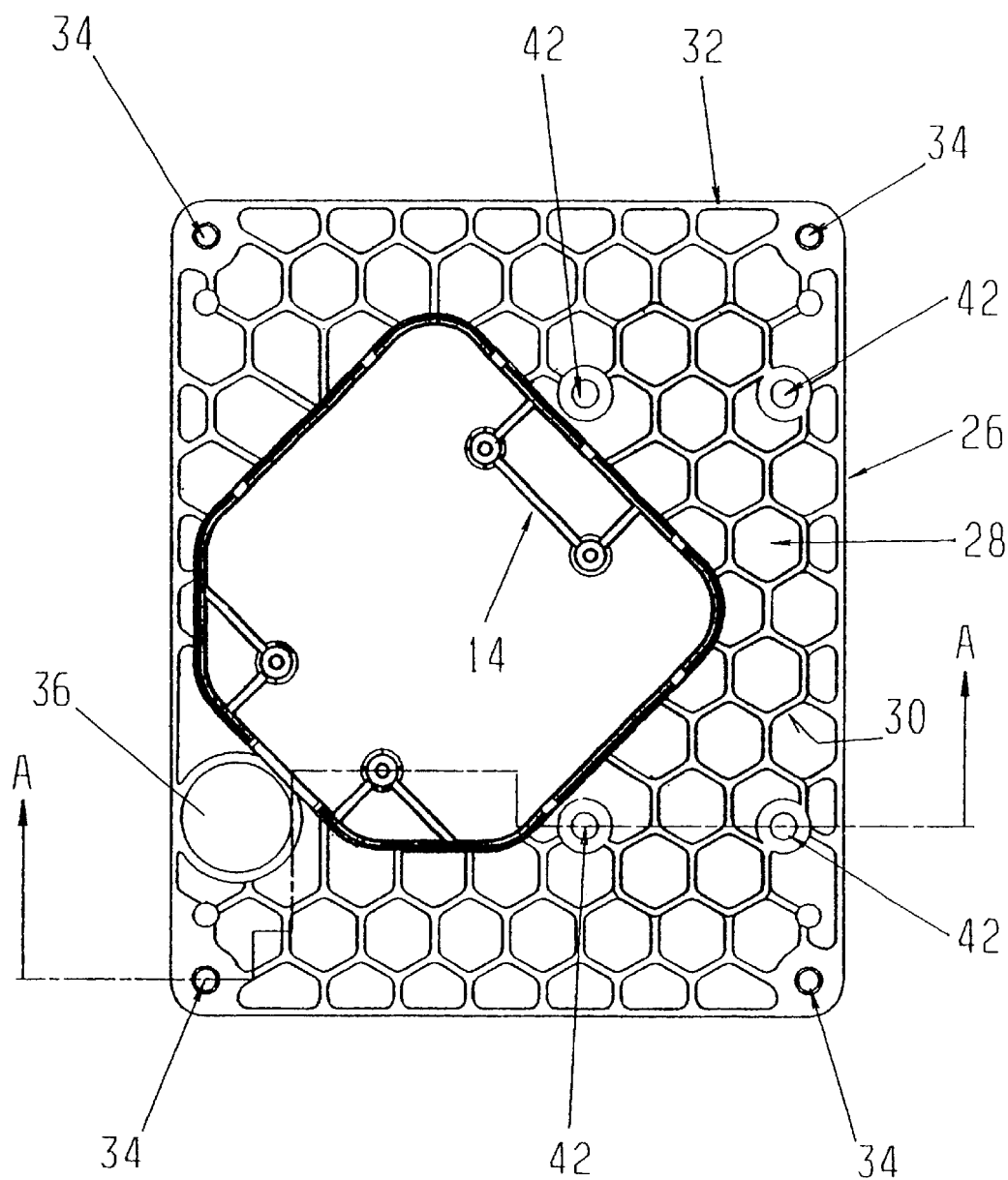

As may be seen from the FIGS. 2, 3 and 4, the carrier plate 12 also possesses connection elements 34 for the mounting of the housing base 6. Also, it has a through opening 36 for the electrical connections to the adjustment device 16, as well as the opening 14 for the adjustment device 16. The connection elements 34, and the opening 14 for the adjustment device 16 are made integrally with the carrier plate 12.

Figure 5A:
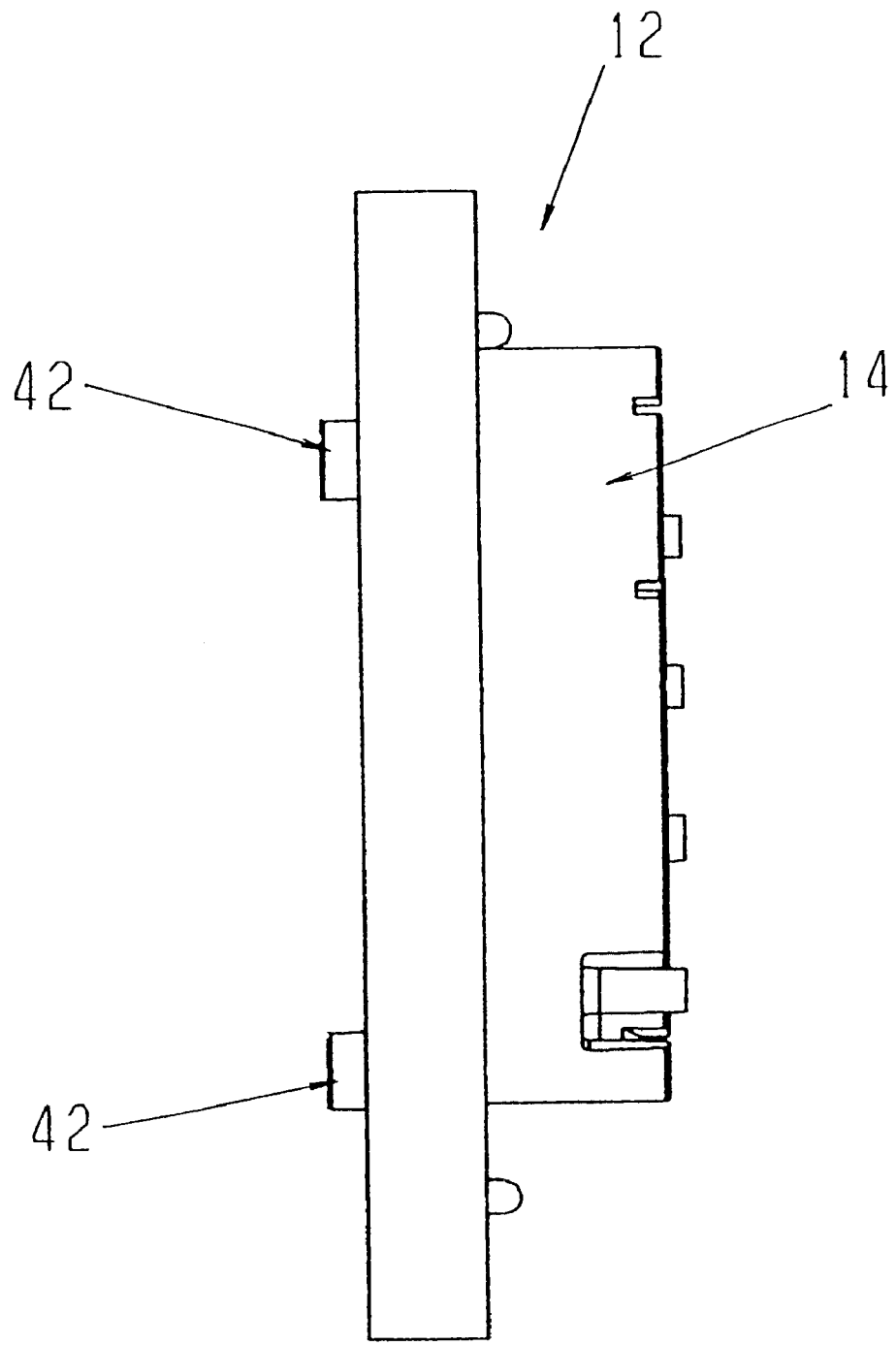
Figure 5B:
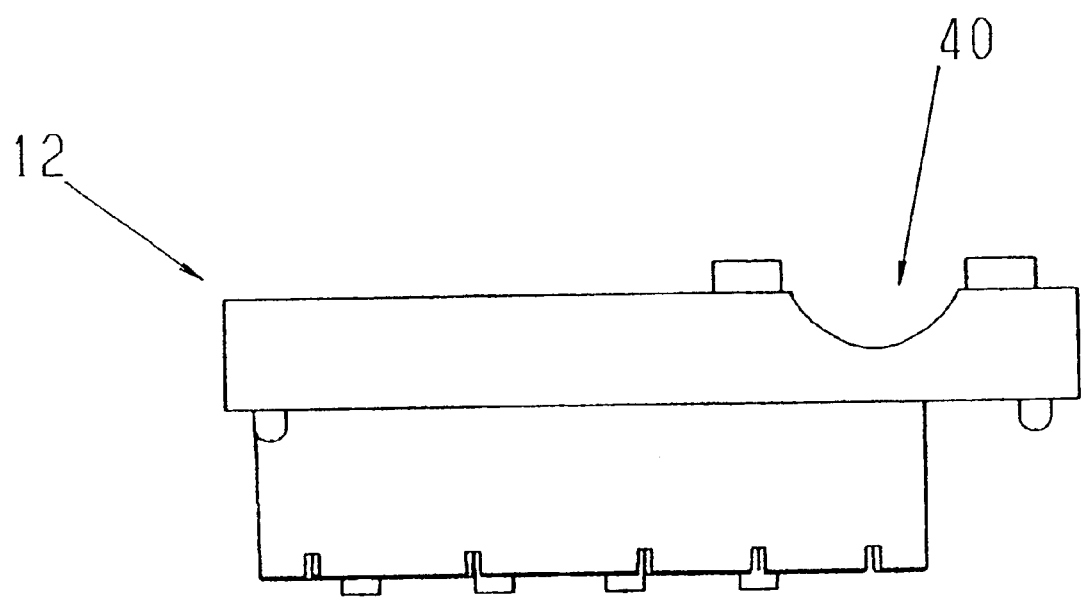
Figure 6:
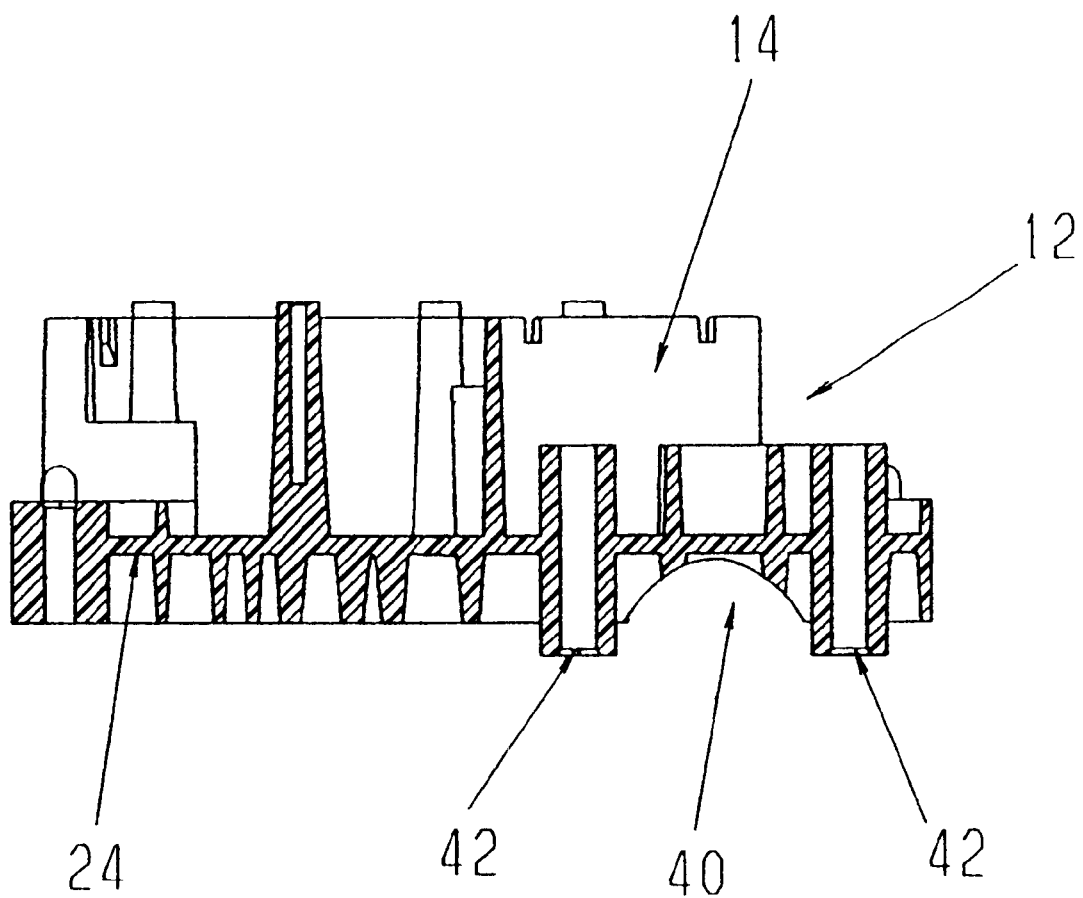
Figure 7:
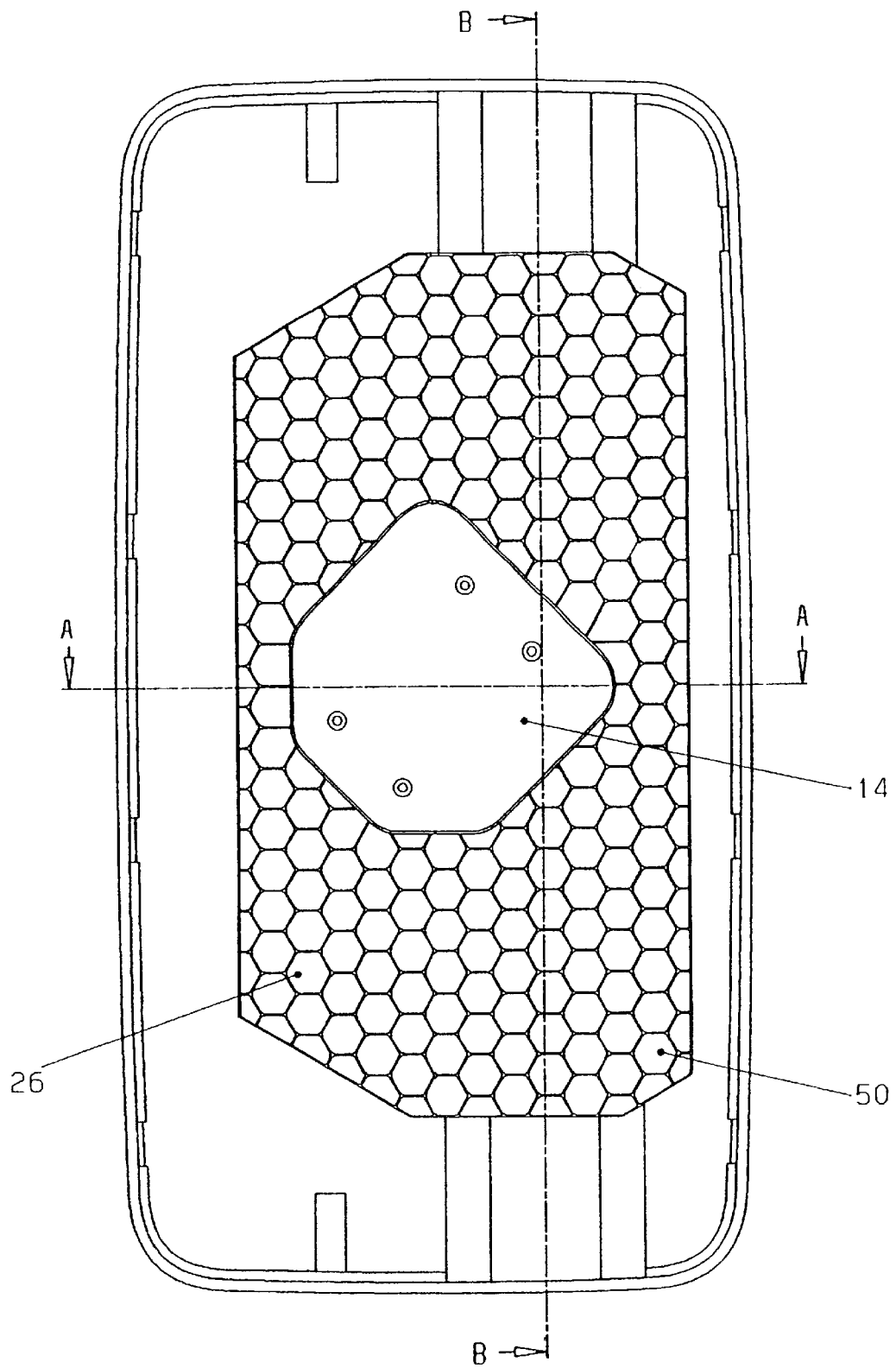
Figure 8:
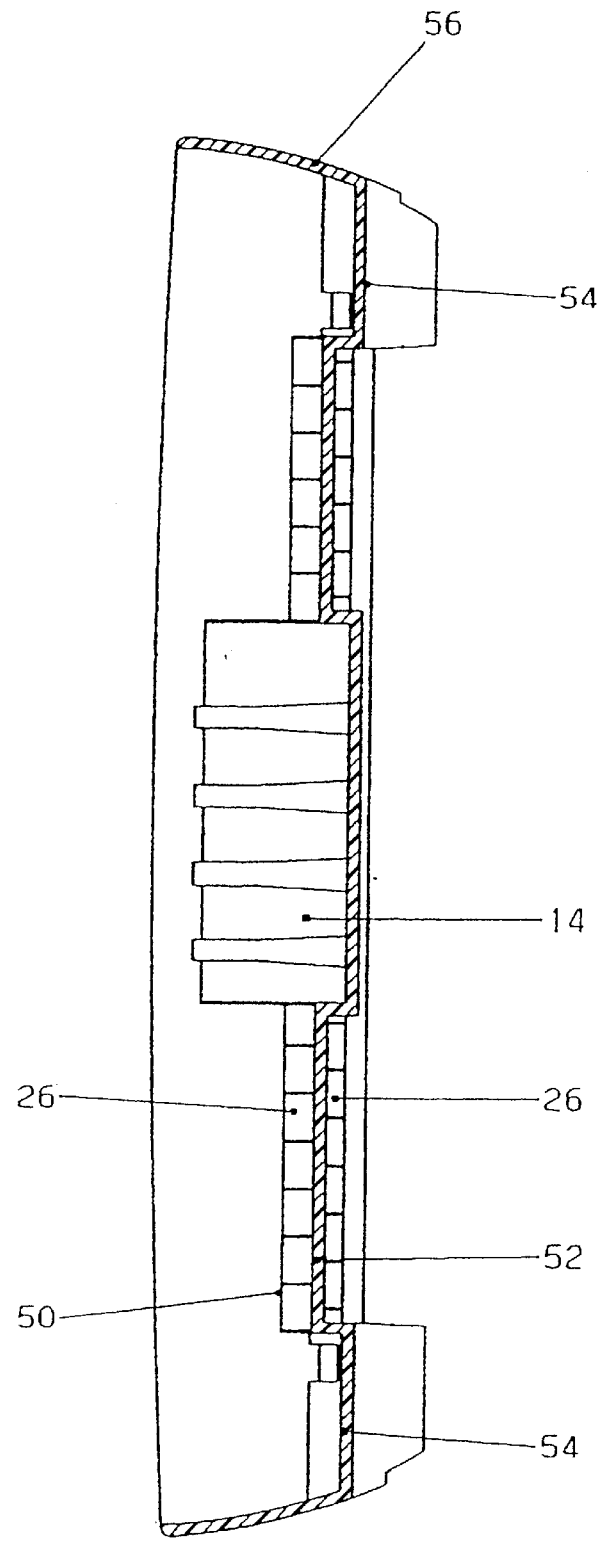

In FIGS. 5b and 6, an integrated clamping recess 40 is shown in the carrier plate 12 into which the holder 2 grippingly protrudes. FIGS. 2 to 6 present connection elements, i.e. borings 42 which are penetrated by threaded bolts (not shown nor further described) in order to bind a clamping member (not shown nor further described) with the clamping recess 40.

Referring now to the FIGS. 7 to 11, a second embodiment of the invention is described with a carrier plate 50, which, likewise, is constructed with a base plate 52 with a honeycomb structure 26 on the front side and on the back side. Differentiated from the first embodiment in accord with FIGS. 1 to 6, the base plate 52 of the carrier plate 50 is of one piece with a housing base 54 and the housing rim 56. By means of the one piece construction including the housing rim 56, the housing base 54 and the base plate 52 of the carrier plate 50, the number of separate components is reduced, so that the construction is simplified. Moreover, through this integration, a greater stability is achieved which positively influences the damping and vibration characteristics.

Figure 9:
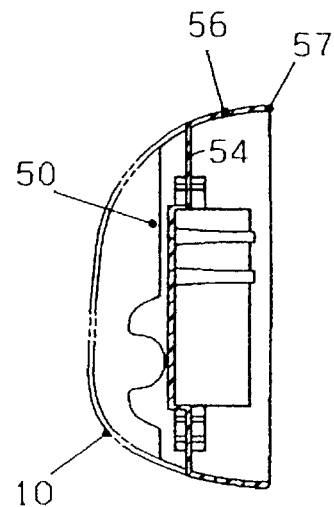
Figure 10:
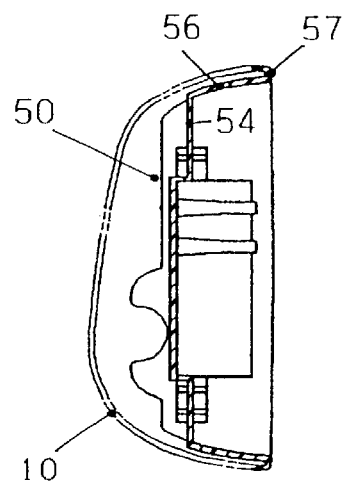
Figure 11:
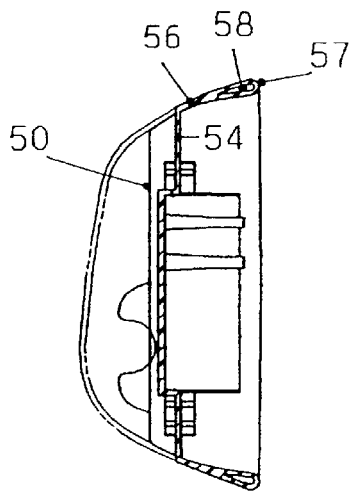

In the sectional drawings of the FIGS. 9, 10 and 11, three different versions of the invention are shown. These three versions differ essentially in the configuration of the front edge 57 of the housing rim 56.

In FIG. 9, the housing rim 56 extends generally in an "L" shape away from the housing base 54. In the embodiment shown in FIG. 10, the housing rim 56 is "U" shaped on the front edge 57 and bent around in a bow and offers a receiving surface for the cover 10.

Finally, in the embodiment shown in FIG. 11, the housing rim 56 on the front edge 57 is expanded around a hollow space.

It will be apparent to those skilled in the art that various modifications and variations can be made to the present invention without departing from the scope and spirit of the invention. It is intended that the present invention include such modifications and variations as come with the scope of the appended claims and their equivalents.

That which is claimed is:

1. An external rearview mirror assembly for a vehicle comprising:
    a housing;
    a carrier plate attachable within the housing by one of a sliding attachment, a screw attachment, a snap-in attachment, a shape-fit attachment, a clamping attachment and combinations thereof;
    a mirror adjustment assembly mountable to the carrier plate; and
    a mirror arrangement mountable to one of the mirror adjustment assembly and the carrier plate, the mirror arrangement having a mirror glass extending substantially in a given plane, the carrier plate including a base portion extending substantially parallel to the given plane, the base portion having a front side and a back side, the carrier plate further including a honeycomb structure formed integrally on the front and back sides of the base portion and defining a plurality of cells, the plurality of cells on the front side offset from the plurality of cells on the back side.

2. The external mirror assembly of claim 1, wherein the housing includes a peripheral rim configured to limit pivoting of the mirror assembly.

3. The external mirror assembly of claim 1, wherein each of the cells has six walls.

4. The external mirror assembly of claim 1, wherein the plurality of cells have varying heights.

5. A mirror assembly comprising:
    a carrier plate defining a first side, a second side, and an opening therethrough, the first side configured for attachment of a mirror arrangement, the second side configured for removable attachment within the mirror assembly by one of a sliding attachment, a screw attachment, a snap-in attachment, a shape-fit attachment, a clamping attachment and combinations thereof, wherein the opening is a plurality of cells forming a honeycomb structure, the plurality of cells being disposed on the first and second sides offset from each other, the honeycomb structure integral to the carrier plate, the carrier plate including a first attachment structure and a second attachment structure; and
    a mirror adjustment assembly attached to the carrier plate and operably disposed in the mirror assembly to adjust the mirror arrangement.

6. The mirror assembly of claim 5, wherein the honeycomb structure is located on both of the first and second sides.

7. The mirror assembly of claim 5, wherein each of the cells has six walls.

8. The mirror assembly of claim 5, wherein the plurality of cells have varying heights.

9. The mirror assembly of claim 5, wherein the first attachment structure is a first recess and the second attachment structure is a second recess, one of the recesses configured for attaching the carrier plate to the mirror arrangement, the other of the recesses configured for attaching the carrier plate within the mirror assembly.

10. A mirror assembly having a rearview mirror for a vehicle, the mirror assembly comprising:
   a carrier plate having a base portion with a front side and back side, a plurality of openings therethrough, and a sidewall with at least one indentation thereon, the at least one indentation configured for removable attachment of the carrier plate in the mirror assembly and removable attachment of the rearview mirror to the carrier plate, wherein the rearview mirror extends substantially in a given plane, the base portion extending substantially parallel to the given plane; and
   a mirror adjustment device attachable to the carrier plate and operably disposed within the mirror assembly, the carrier plate and the mirror adjustment device cooperable to adjust the rearview mirror,
   wherein the plurality of openings includes a plurality of honeycomb cells formed integrally with the base portion and offsettingly disposed on the front and back sides.

11. The mirror assembly of claim 10, wherein each of the cells has six walls.

12. The mirror assembly of claim 10, wherein each of the cells extend substantially perpendicularly from the base portion.

13. The mirror assembly of claim 10, wherein the plurality of cells have varying diameters.

14. The mirror assembly of claim 10, wherein the plurality of cells have varying heights.

15. The mirror assembly of claim 10, wherein the carrier plate is removably attached to a housing of the mirror assembly via the at least one indentation.

16. The mirror assembly of claim 10, wherein the carrier plate is removably attached to the mirror adjustment device, the mirror adjustment device attached to a housing of the mirror assembly.

17. The mirror assembly of claim 16, wherein the carrier plate defines a recess for adjustably attaching the mirror adjustment device.

18. The mirror assembly of claim 10, wherein the carrier plate is made from a material selected from the group consisting of a plastic, a metal, an alloy, and combinations thereof.

19. A method for assembling a mirror assembly with a mirror and a detachable carrier plate, the method comprising the steps of:
   a) providing the detachable carrier plate, the detachable carrier plate defining a front side, a back side, and an opening therethrough, wherein the opening includes a plurality of cells defining a honeycomb structure offsettingly disposed on the front and back sides;
   b) attaching the mirror to one of the detachable carrier plate and an adjustment device; and
   c) attaching the detachable carrier plate and the adjustment device within the mirror assembly.

20. The method as in claim 19, further comprising the substeps of attaching the mirror to the adjustment device and attaching the adjustment device to the detachable carrier plate, the adjustment device operably disposed in the mirror assembly to adjust the mirror.

21. The method as in claim 19, further comprising the substeps of attaching the mirror to the detachable carrier plate and attaching the detachable carrier plate to the adjustment device, and attaching the detachable carrier plate and the adjustment device within the mirror assembly by one of a sliding attachment, a screw attachment, a snap-in attachment, a shape-fit attachment, a clamping attachment and combinations thereof, the adjustment device operably disposed in the mirror assembly to adjust the mirror.

22. The method as in claim 19, wherein attaching the carrier plate is selected from the group of substeps consisting of snap-fitting, slidably connecting, rotatably connecting and combinations thereof.

23. The method as in claim 19, wherein the mirror assembly includes a peripheral rim configured to limit pivoting of the mirror.

24. The method as in claim 19, wherein each of the cells has six walls.

25. The method as in claim 19, wherein the plurality of cells have varying heights.

26. The method as in claim 19, wherein the carrier plate is made from a material selected from the group consisting of a plastic, a metal, an alloy, and combinations thereof.

* * * * *